United States Patent Office 3,541,042
Patented Nov. 17, 1970

3,541,042
SOLVENT COMPOSITIONS FOR NATURAL AND SYNTHETIC RUBBER BASE ADHESIVES
Sheldon G. Levy, Midland, Mich., assignor to The Dow Chemical Company, Midland, Mich., a corporation of Delaware
No Drawing. Continuation-in-part of application Ser. No. 523,937, Feb. 1, 1966. This application Dec. 15, 1967, Ser. No. 690,744
Int. Cl. C08a 51/30; C08c 11/24; C08f 45/30
U.S. Cl. 260—338    6 Claims

ABSTRACT OF THE DISCLOSURE

The present invention relates to novel compositions of matter suitable for use as solvents. More particularly the present invention concerns compositions which are mixtures of chlorinated hydrocarbon solvents which mixtures have particular utility as solvents for natural and synthetic rubber, including the so-called silicone rubbers, which may be used either as adhesives or coatings and which are further characterized by their general purpose utility as solvents which are nonflammable and which have designable evaporation rates.

---

This application is a continuation-in-part of my earlier filed application Ser. No. 523,937, filed Feb. 1, 1966, now abandoned.

BACKGROUND OF INVENTION

The prior art in the field to which the present invention pertains is so notorious, little need be said about it. The adhesive and coating base materials here under consideration include natural rubber, reclaimed rubber, synthetic rubbers, and rubber conversion products such as chlorinated rubber, cyclized rubber, rubber hydrochloride, the silicone rubbers (e.g., silastics, methyl siloxane, and phenyl methyl siloxane elastomers) which together with a solvent for these rubbers produce a solvent-responsive adhesive or coating. The compounding of the rubber and synthetic rubber bases and incorporation of resins is of considerable influence on the properties of the adhesive and coatings. Solvents have been chosen on the basis of economy when other considerations will permit. The cheapest and most plentiful are aliphatic hydrocarbon solvents which are useful for rubber, cyclized rubber, and hydrocarbon polymers (Buna-S, Butyl rubber, and polyisobutylene). The aromatic hydrocarbon solvents which generally serve for chlorinated rubber, chloroprene polymers (neoprene), and butadieneacrylonitrile copolymers of low acrylonitrile content are benzene and toluene. Ketones, nitroparaffins, chlorinated hydrocarbon solvents, or esters are necessary to dissolve butadiene-acrylonitrile copolyemrs of higher acrylonitrile content (Buna-N). The choice of resins for use with these base materials is usually governed by considerations of solubility. Esters (for example, phthalates) are useful with Buna-N, whereas hydrocarbon resins, or those having a low content of polar groups, are more adaptable to rubber, Buna-S, Butyl rubber, and polyisobutylene. Chlorinated resins may be used with chlorinated rubber. Typical resins added to the rubber and solvent to improve tack are generally based on terpene polymers, the hydrogenated coumarone-indene resins, phenol-adehyde resins, and the acetylene-p-tert-butylphenol resin (Woresin). It will be readily recognized that the most generally employed solvents for rubber-base adhesives are the low molecular weight liquid petroleum hydrocarbons, the aromatic hydrocarbons, such as benzene and toluene, and the lower aliphatic ketones such as, for example, methylethylketone. With but a few exceptions the solvents employed over the past years have been flammable and in some cases have objectionable odors. In addition many of the solvents have poor evaporation rates and limited solvency for certain of the rubbery elastomers used as the base for rubber adhesives and coatings.

It is an object of the present invention to provide a non-flammable solvent which has particular utility for rubber-base adhesives and coating compositions. It is a further object of the present invention to provide a solvent for rubber-base adhesives and coatings which will in addition to having the aforesaid advantages dissolve higher concentration of rubber and resin than present day solvents. It is a further object of the present invention to provide a class of non-flammable general purpose solvents which have within certain limits designable evaporation rates.

An additional object is to provide a solvent which will dissolve both the low acrylonitrile and high acrylonitrile copolymers in greater amounts than solvent systems presently employed.

These and other objects will become apparent from the following description and claims.

BRIEF DESCRIPTION OF INVENTION

It has now been found that three and four component mixtures of certain chlorinated aliphatic hydrocarbon solvents can be prepared which have in combination non-flammability, dissolve a high concentration of rubber per unit solvent volume, have a commercially acceptable evaporation rate and exhibit acceptable viscosities even when the solids content is high as compared with present day commercial rubber solvents. The solvent mixtures which have been found to exhibit these desirable properties and three- and four-component systems of methylene chloride, 1,2-dichloroethylene, 1,3-dichloroethane (ethylene dichloride), trichloroethylene and methylchloroform. It will be readily recognized that of this list of five chlorinated aliphatic hydrocarbons two, 1,2-dichloroethylene and ethylene dichloride, are flammable according to Underwriters Laboratory Ratings.

DETAILED DESCRIPTION OF INVENTION

The amounts of the individual ingredients which when employed in combination in accordance with the present invention and which exhibit the improved properties set forth above are:

| | Percent by volume |
|---|---|
| Methylene chloride ($CH_2Cl_2$) | 20–70 |
| 1,2-dichloroethylene ($C_2H_2Cl_2$) | 0–70 |
| 1,2-dichloroethane (ethylene dichloride) ($C_2H_4Cl_2$) | 0–25 |
| Trichloroethylene ($C_2HCl_3$) | 0–40 |
| 1,1,1-trichloroethane (methylchloroform) ($C_2H_3Cl_3$) | 0–40 |

It is to be understood that when neither trichloroethylene nor methylchloroform are employed the 1,2-dichloroethylene is employed in amounts greater than 1 percent by volume and preferably greater than 10 percent by volum. It is to be further understood that in every composition of the present invention at least 20 percent by volume of methylene chloride is employed. Representative compositions which have been tested and found useful in accordance with the present invention are:

| | Percent by volume | | | |
|---|---|---|---|---|
| Composition | A | B | C | D |
| Methyl chloride | 20 | 40 | 30 | 30 |
| 1,2-dichloroethylene | 70 | | 50 | 10 |
| Trichloroethylene | 10 | 20 | 20 | 0v |
| Ethylene dichloride | | 15 | | |
| Methyl chloroform | | 25 | | 20 |

The preferred solvent compositions from the standpoint of non-flammability, and solvency are mixtures of from 20 to 40 percent methylene chloride, 50 to 70 percent 1,2-dichloroethylene and 10 to 20 percent trichloroethylene as a three component solvent, and from 30 to 70 percent methylene chloride, 5 to 20 percent ethylene dichloride, 10 to 30 percent trichloroethylene and 15 to 35 percent methyl chloroform and in which 1,2-dichloroethylene may be substituted for either the ethylene dichloride or the methyl chloroform as a four component solvent.

Suitable rubbers and resins other than those here named and illustrated for preparing the rubber adhesives or coatings are well known in the art and are set forth in the statement of the prior art above.

The following examples illustrate the present invention but are not to be construed as limiting.

EXAMPLE 1

Various amounts of a terpene-phenolic resin (Super Beckacite 2000) were dissolved in 100 milliliters of one of the solvent compositons set forth in the table below. To each resin-solvent solution was added a rubber which had been cut into small pieces. The various rubbers employed were chloroprene rubber (Neoprene AC), acrylonitrile-butadiene rubber (Hycar 1022) and styrene butadiene rubber (Kraton 101). The relative amounts of rubber and resin employed were two parts by weight of rubber per part of resin. Three different concentrations of the rubber resin compositions were also employed, to wit: 15 grams total rubber-resin solids (10 grams of rubber and 5 grams of resin), 30 grams total rubber resin solids (20 grams rubber and 10 grams of resin) and 60 grams total rubber-resin solids (40 grams rubber and 20 grams of resin). Once the resin was dissolved in the solvent the resulting mixture was poured into a resin lined can which had a resin coated friction lid. The necessary amount of rubber in small pieces was added, a stainless steel roller bar was placed in the can and the friction lid pressed in place to form a liquid tight seal. Several cans prepared in a like manner, differing only in the kind and amount of rubber-resin solids, were packed into a cylindrical cardboard container and the container so packed placed on a roller mill. The mill with the container was operated continuously overnight. In the morning the cans were removed from the cylinder and the contents of each can transferred to a clean 4 oz. bottle fitted with a tin lined screw-cap. The material from each can was observed during this transfer and after transfer for any signs of heterogeneity of the composition. Shortly after transfer was complete the viscosiy of those samples exhibiting no visible heterogeneity was measured with a Brookfield viscometer. These viscosity measurements were all accomplished during the same day that the transfer from the cans was made. The results of the observations and the data collected from carrying out the above procedures are set forth below.

| Solvent, percent by volume | Rubber resin Kind | Rubber resin Gms./100 ml. | Viscosity, centipoises | Remarks |
|---|---|---|---|---|
| (1) {70—1,2,—$C_2H_2Cl_2$[1] / 20—$CH_2Cl_2$[2] / 10—$C_2HCl_3$[3]} | A[4] | 15 / 30 / 60 | 340 / 5,950 / ------ | A heterogenous mass was observed. |
| | B[5] | 15 / 30 / 60 | 294 / 3,950 / 12,080 | |
| | C[6] | 15 / 30 / 60 | 76 / 700 / 10,040 | |
| (2) {40—$CH_2Cl_2$ / 25—1,1,1-$Cl_3C_2H_3$[7] / 20—$C_2HCl_3$ / 15—1,2-$C_2H_4Cl_2$} | A | 15 / 30 / 60 | 446 / 6,750 / ------ | A heterogeneous mass was observed. |
| | B | 15 / 30 / 60 | 349 / 5,000 / ------ | A heterogeneous mass was observed. |
| | C | 15 / 30 / 60 | 80 / 1,050 / 13,320 | |
| (3) {50—$C_2H_2Cl_2$ / 30—$CH_2Cl_2$ / 20—$C_2HCl_3$} | A | 15 / 30 / 60 | 313 / 5,970 / ------ | A heterogeneous mass was observed. |
| (4) n-Hexane | A | 15 / 30 / 60 | ------ | Not soluble. |
| | B | 15 / 30 / 60 | ------ | |
| | C | 15 / 30 / 60 | ------ | |
| (5) MEK | A | 15 / 30 / 60 | ------ | Partially soluble. |
| | B | 15 / 30 / 60 | 185 / 3,350 / ------ | Partially soluble. |
| | C | 15 / 30 / 60 | ------ | Questionable solubility. / Homogeneous mass, non-flowing. / Do. |
| (6) Toluene | A | 15 / 30 / 60 | 590 / ------ / ------ | Partially soluble. / Partially soluble, ¾ not in solution. / Partially soluble. |
| | B | 15 / 30 / 60 | 234 / 8,050 / ------ | Partially soluble, ¼ not in solution. / Most of rubber not in solution. |
| | C | 15 / 30 / 60 | 88 / 950 / 16,200 | Small amount of insoluble rubber-like insolubles. |

[1] $C_2H_2Cl_2$—stabilized 1,2-dichloroethylene (40% cis, 60% trans).
[2] $CH_2Cl_2$—stabilized methylene chloride.
[3] $C_2HCl_3$—stabilized trichloroethylene.
[4] Chloroprene rubber.
[5] Acrylonitrile butadiene rubber.
[6] Styrene butadiene rubber.
[7] $C_2H_3Cl_3$—stabilized 1,1,1-trichloroethane.
[8] $C_2H_4Cl_2$—ethylene dichloride.

By the term stabilized is meant the subject chlorinated solvent as sold by the manufacturer containing small percentages of various chemical compounds to inhibit the decomposition of the solvent in the presence of metals, oxygen and/or light.

EXAMPLE 2

In a similar manner as Example 1, various synthetic silicone rubbers were added to numerous solvents normally used, as well as the preferred solvent compositions of the present invention. The results of tests wherein different loadings, all above normal loadings, are set forth in tabular form below:

| Silicone rubber, gms./100 ml. | Solvent | Viscosity, cps. |
|---|---|---|
| I, 50 | MeCl$_2$ 40%<br>C$_2$HCl$_3$ 20%<br>C$_2$H$_4$Cl$_2$ 15%<br>1,1,1-C$_2$H$_3$Cl$_3$ 25% | 7,875 |
| I, 50 | Methylene chloride (MeCl$_2$) | 16,250 |
| I, 50 | Xylene | 17,000 |
| II, 50 | MeCl$_2$ 40%<br>C$_2$HCl$_3$ 20%<br>C$_2$H$_4$Cl$_2$ 15%<br>C$_2$H$_3$Cl$_3$ 25% | 25 |
| II, 25 | | 4 |
| II, 50 | MeCl$_2$ | Paste |
| II, 50 | Xylene | Paste |
| II, 50 | MeCl$_2$ 30%<br>C$_2$HCl$_3$ 20%<br>C$_2$H$_2$Cl$_2$ 50% | 4 |
| II, 50 | Dichloroethylene | 2,820 |
| II, 50 | Trichloroethylene | 4,500 |
| II, 50 | 1,1,1-trichloroethane | 5,250 |
| II, 50 | Toluene | (¹) |

I—A dimethyl siloxane elastomer.
II—A phenyl methyl siloxane elastomer.
¹ Not homogeneous.

EXAMPLE 3

In another series of experiments, a heat resistant tackifier or open time modifier (phenolic resin+MgO) was prepared in various solvents and the time to reach 200° C., the softening point of the resin. The resin is then employed with chloroprene rubber cements. The following table illustrates the advantage of employing the present invention in the solvent for the modifier.

Five parts by weight of MgO was reacted with 45 parts of phenolic resin, Bakelite CKR 1634 in 200 parts of solvent and 0.1% by weight of H$_2$O.

| Solvent | Volume percent | Time, hrs. | Temp., °C. |
|---|---|---|---|
| Methylene chloride | 30 | 1½ | 120–130 |
| Trichloroethylene | 20 | 2 | 170–180 |
| Dichloroethylene | 50 | 2½ | >200 |
| Methylene chloride | 40 | | |
| Trichloroethylene | 20 | | |
| Ethylene dichloride | 15 | 1½ | >200 |
| 1,1,1-trichloroethane | 25 | | |

For comparative purposes, the following tests were run:

| | Time, hrs. | Temp., °C. |
|---|---|---|
| Toluene | 1½ | >200 |
| Methyl ethyl ketone | | (*) |
| n-Hexane | Insoluble | |

*Did not react to completion within 2½ hrs.

EXAMPLE 4

To illustrate the versality of the compositions of the present invention to solubilize high molecular weight rubbers, the following tests were run. Comparative data of conventional solvents are also listed.

| Acrylonitrile-butadiene rubber from Firestone | Hexane | Toluene | MEK¹ | Ethyl acetate | Monochloro benzene | Solvent C² | Solvent B³ |
|---|---|---|---|---|---|---|---|
| FR-N-500, low acrylonitrile | x | x | 2,450 | 1,230 | 3,900 | 1,400 | 2,300 |
| FR-N-501, medium acrylonitrile | x | x | x | x | x | 3,500 | 3,600 |
| FR-N-503, high acrylonitrile | x | x | x | x | x | 5,200 | 8,100 |

¹ MEK—methyl ethyl ketone.
² Solvent C—MeCl$_2$ 40%, trichloroethylene 20%, C$_2$H$_4$Cl$_2$ 15%, C$_2$H$_3$Cl$_3$ 25%.
³ Solvent B—MeCl$_2$ 30%, ethylene dichloride 50%, C$_2$HCl$_3$ 20%.
x—not homogeneous.

The evaporation ratio of the solvent compositions of the present invention is from about 2.5 to 3.0 when compared to ethyl ether as 1.0 (according to the National Association of Mutual Casualty Companies Handbook of Organic Industrial Solvents (2nd Ed.)). The evaporation rate of methyl ethyl ketone is 2.7 when compared on the same scale and toluene is 4.5 on the same scale.

The solvent compositions of the present invention are rated non-flammable according to test data developed by running the ASTM Tag Open-Cup D 1310–55T flammability test. Methyl ethyl ketone, toluene and hexane are flammable materials as are two of the individual ingredients of the compositions of the present invention, 1,2-dichloroethylene and ethylene dichloride. It is thus surprising to find that compositions of the present invention containing over 50 percent by volume of 1,2-dichloroethylene are non-flammable in the vapor phase throughout the normal evaporation cycle of the composition containing the same.

The compositions of the present invention are capable of dissolving higher concentrations of the rubbers than previously employed solvents. A series of tests were conducted employing a piece of neoprene AC soft (weight 7.1±0.2 g., thickness ⅝", width 1", length 1½") suspended in the test solvent. The solvent was contained in a glass container (inside diameter 3") and the neoprene strip suspended in the center of the liquid. A magnetic stirrer was inserted, the container sealed and the stirrer activated at a constant speed of approximately 500 r.p.m.

At given intervals, samples of solution were removed by means of a hypodermic syringe, and the solids content determined. The amount of solvent employed was calculated to give a final concentration of approximately 2 g./100 ml. of solvent. ("Solvent B" and "Solvent C" as hereinafter employed is the same composition as defined in footnotes 2 and 3 in Example 4).

The results are listed below:

| Solvent | Toluene | Toluene/hexane/acetone | C | B |
|---|---|---|---|---|
| Weight | 2.01 | 2.07 | 2.00 | 2.04 |
| Time, hrs | 5 | 5.36 | 3 | 4 |
| Ratio | 93 | 100 | 56 | 75 |

In another series of tests, the time to develop maximum strength of a bond was determined, commonly referred to as freeze rate. A canvas-to-canvas bond was established employing the same concentration of rubber solids in various solvents. Comparisons of bond strengths of conventional solvents with solvents of the present invention are set forth in the table below:

| Solvent | Toluene | Toluene/acetone/hexane | C | B |
|---|---|---|---|---|
| Bond strength after 3 days, lbs./in | 37 | 23 | 85 | 25 |
| Time for maximum bond strength, days | 12 | 9 | 3 | 21 |
| Maximum strength, lbs./in | 85 | 57 | 85 | 73 |

The freeze rate was measured by determining the time required to develop the maximum bond strength. The canvas-to-canvas bonds were prepared as previously described.

For toluene and Solvent C cements, bonds tested on light canvas produced failure in the cloth, and therefore were repeated with heavy canvas #2 to obtain the peel strength values.

The results are reported below.

TABLE I.—TOLUENE CEMENT—LIGHT CANVAS

| Aging time (days) | Peel strength (lbs./inch) |
|---|---|
| 1 | 12.5 |
| 2 | 12 |
| 6 | 32 |
| 8 | 40 |
| 15 | [1]60 |
|  | [1]65 |
|  | [1]62 |
| 23 | [1]80 |
|  | [1]69 |

[1] Cloth torn.

TABLE II.—TOLUENE CEMENT—HEAVY CANVAS

| Aging time (days) | Peel strength (lbs./inch) |
|---|---|
| 3 | 37 |
| 5 | 35 |
| 12 | 85 |
| 18 | 80 |

TABLE III.—HEXANE-ACETONE-TOLUENE CEMENT—LIGHT CANVAS

| Aging time (days) | Peel strength (lbs./inch) |
|---|---|
| 2 | 17 |
| 3 | 23 |
| 9 | 57 |
| 15 | 57 |

TABLE IV.—SOLVENT C CEMENT—LIGHT CANVAS

| Aging time (days) | Peel strength (lbs./inch) |
|---|---|
| 2 | 33 |
| 5 | [1]57 |
|  | [1]58 |
|  | [1]64 |
|  | [1]46 |
| 6 | 41 |
| 7 | [1]57 |
|  | [1]72 |
|  | [1]72 |
|  | [1]74 |
| 14 | [1]55 |
|  | [1]61 |
|  | [1]60 |
| 21 | [1]63 |
|  | [1]74 |
|  | [1]69 |
|  | [1]57 |
| 27 | [1]57 |

[1] Cloth torn.

TABLE V.—SOLVENT C CEMENT—HEAVY CANVAS

| Aging time (days) | Peel strength (lbs./inch) |
|---|---|
| 3 | 85 |
| 5 | 75 |
| 12 | 85 |
| 18 | 85 |

TABLE VI.—SOLVENT B CEMENT—LIGHT CANVAS

| Aging time (days) | Peel strength (lbs./inch) |
|---|---|
| 2 | 22 |
| 3 | 25 |
| 8 | 48 |
| 15 | 64 |
| 21 | [1]56 |
|  | 73 |

[1] Cloth torn.

A test employing the solvents of the present invention for a MgO-phenolic resin-neoprene adhesive indicates the solvents of the present invention are useful to replace toluene, the conventional solvent. The solvents of the present invention permit the MgO-phenolic resin reaction to occur in a solvent which is more advantageous than toluene when the neoprene is added and the adhesive composition is prepared. The beneficial results expressed in the earlier examples of higher loadings, lower viscosities and quicker freeze rates are obtained in this adhesive composition.

I claim:
1. A solvent composition characterized in that it will dissolve natural and synthetic elastomers, which are adhesive and coating base materials, up to about 50 grams of solids per 100 milliliters of solvent and which solvent does not have a flash point at its boiling point, said solvent having trichloroethylene present in the amount of 10–20 percent by volume, methylene chloride present in the amount of 20–40 percent by volume and 1,2-dichloroethylene present in the amount of 50 to 70 percent by volume and in which ethylenedichloride is present in from 0 to 25 percent by volume and methyl chloroform is present in from 0 to 40 percent by volume.

2. A composition of matter useful as a solvent for rubber base adhesives and coatings which are prepared from natural or synthetic elastomers, which are adhesive and coating base materials, and synthetic tackifying resin of the phenol-aldehyde or terpene-aldehyde type, and silicone resins wherein said elastomer is the predominant solid ingredient to be solubilized, consisting of 20 to 40 volume percent methylene chloride, 10 to 25 volume percent methyl chloroform, 10 to 20 volume percent trichloroethylene, 15 to 60 volume percent ethylene dichloride and 0 to 70 percent by volume 1,2-dichloroethylene.

3. An adhesive composition characterized in that a natural or synthetic elastomer, which is an adhesive and coating base material, in an amount up to about 50 grams of solids is dissolved in 100 milliliters of a solvent which does not have a flash point at its boiling point, said solvent consisting of trichloroethylene present in the amount of 10–20 percent by volume, methylene chloride present in the amount of 20–40 percent by volume and 1,2-dichloroethylene present in the amount of 50 to 70 percent by volume, 0 to 25 volume percent ethylene dichloride and 0 to 40 percent methylene chloride.

4. The composition according to claim 2 consisting of a solvent having the composition 20 to 40 volume percent methylene chloride, 10 to 25 volume percent methyl chloroform, 10 to 20 volume percent trichloroethylene, 15 to 60 volume percent ethylene dichloride, and 10 to 50 grams of silicone elastomer per 100 milliliters of solvent.

5. The composition according to claim 2 consisting of a solvent having the composition 20 to 40 volume percent methylene chloride, 10 to 25 volume percent methyl chloroform, 10 to 20 volume percent trichloroethylene, 15 to 60 volume percent ethylene dichloride, and 10 to 50 grams of acrylonitrile butadiene rubber per 100 milliliters of solvent.

6. The composition according to claim 2 consisting of a solvent having the composition 20 to 40 volume percent methylene chloride, 10 to 25 volume percent methyl chloroform, 10 to 20 volume percent trichloroethylene, 15 to 60 volume percent ethylene dichloride, and 10 to 50 grams of styrene butadiene rubber per 100 milliliters of solvent.

References Cited
UNITED STATES PATENTS

| | | |
|---|---|---|
| 2,755,261 | 7/1956 | Clark. |
| 2,822,352 | 2/1958 | Taun. |
| 3,231,532 | 1/1966 | Modic. |

OTHER REFERENCES

Petroleum Processing, vol. 10, November 1955, pp. 1746–1749.

Industrial Solvents, 2nd Edition, 1950, Mellan, pp. 206–207 relied on.

MORRIS LIEBMAN, Primary Examiner

SAMUEL L. FOX, Assistant Examiner

U.S. Cl. X.R.

260—846

PO-1050
(5/69)

UNITED STATES PATENT OFFICE
CERTIFICATE OF CORRECTION

Patent No. 3,541,042            Dated 17 November 1970

Inventor(s) Sheldon G. Levy

It is certified that error appears in the above-identified patent and that said Letters Patent are hereby corrected as shown below:

In column 1, line 66, change "(Woresin)" to --(Koresin)--.

In column 2, line 33, change "and" to -- are --; line 34, change "1,3" to -- 1,2 --; in the table at line 69 change "Methyl" to -- Methylene --; at line 71 the "40" in column D is upside down.

Signed and sealed this 25th day of May 1971.

(SEAL)
Attest:

EDWARD M. FLETCHER, JR.           WILLIAM E. SCHUYLER, JR.
Attesting Officer                  Commissioner of Patents